G. L. GRAHAM.
BRAKE MECHANISM.
APPLICATION FILED NOV. 11, 1912.
1,068,425.
Patented July 29, 1913.
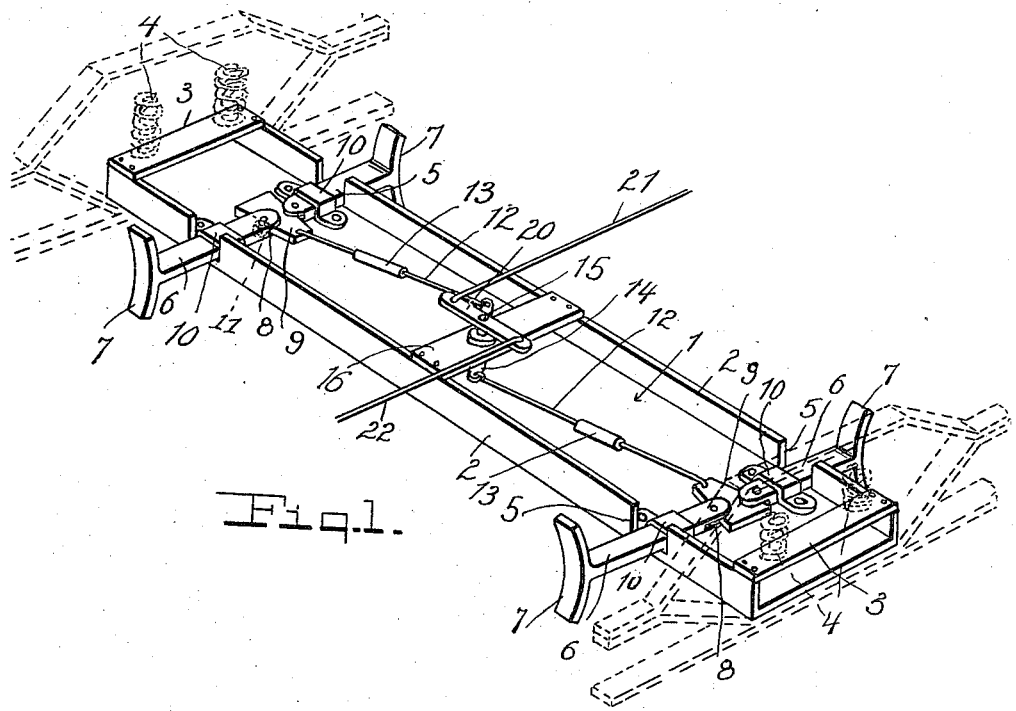
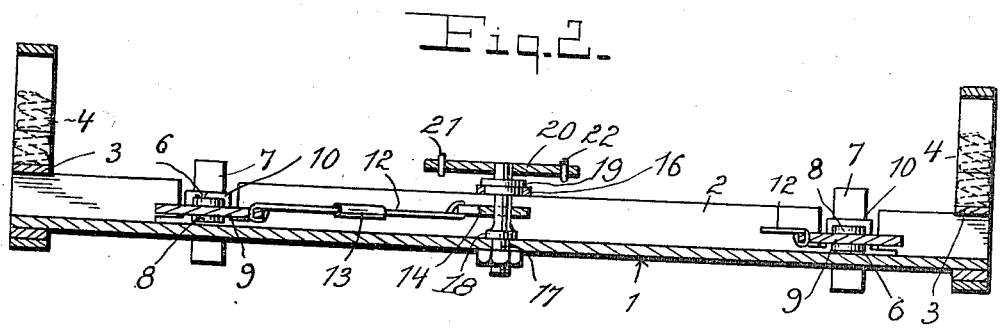
Witnesses
Robert M. Sutphen
A. L. Hind
Inventor
G. L. Graham
By Watson E. Coleman
Attorney

UNITED STATES PATENT OFFICE.

GEORGE L. GRAHAM, OF FLORENCE, SOUTH CAROLINA.

BRAKE MECHANISM.

1,068,425.  Specification of Letters Patent.  Patented July 29, 1913.

Application filed November 11, 1912. Serial No. 730,705.

*To all whom it may concern:*

Be it known that I, GEORGE L. GRAHAM, a citizen of the United States, residing at Florence, in the county of Florence and State of South Carolina, have invented certain new and useful Improvements in Brake Mechanism, of which the following is a specification, reference being had to the accompanying drawings.

This invention comprehends certain new and useful improvements in brake equipment for railway cars, particularly freight cars, and the invention has for its primary object a simple, durable and efficient construction of brake mechanism, whereby the use of the ordinary brake beam is obviated and the possibility of accidents that are of such frequent occurrence, owing to the dropping of the brake beam and the derailment of the train, being thereby precluded.

The invention also has for its object an improved mechanism of this character which will be compact and the parts of which will be capable of being easily manufactured and readily assembled and adjusted and also capable of being easily replaced should any part become broken. And the invention also aims to generally improve devices of this class so as to render them more useful and commercially desirable.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawing, in which, Figure 1 is a perspective view of my improved brake-actuating mechanism, portions of a truck being shown merely for the purpose of illustration and the rest of the truck being omitted in order not to hide the essential elements of the mechanism, and Fig. 2 is a sectional view of the device, the section being taken transversely of the truck.

Corresponding and like parts are referred to in the following description and designated in the accompanying drawing by like reference characters.

In carrying out my invention, I incorporate in the truck of the car, a spring supporting plate 1 which is of trough-shape, as clearly illustrated in Fig. 1, with its side flanges 2 projecting upwardly. This spring plate extends from one side frame of the truck to the other and is preferably supported on and riveted or otherwise rigidly secured to the lower pedestals of the frames. Secured to the supporting plate 1 at or near the ends thereof and riveted or otherwise secured to the upper edges of the side flanges 2, are cross bars 3 on which the springs 4 are directly supported. The side flanges 2 of the supporting plate 1 are formed with recesses 5, front and rear, in which recesses, brake arms 6 are accommodated for a sliding movement on the supporting plate 1 transversely of the length thereof, there being two pairs of these brake arms 6 formed at their outer ends with heads 7 which are shaped and constructed in any desired manner to support the brake shoes (not shown). The inner or adjoining ends of the arms 6 of each pair are disposed in spaced relation to each other and are forked or recessed, as indicated at 8, to receive a wedge 9 which is mounted for a sliding movement on the supporting plate 1 transversely of the line of movement of the arms 6, the latter being held for a proper sliding movement by guide straps 10, as clearly illustrated in Fig. 1. Preferably, to reduce the friction between the wedges 9 and the inner or adjoining ends of the arms 6, anti-friction rollers 11 are carried by the forked ends of the arms and bear directly against the side edges of the wedges which are received in the forks or recesses of the arms.

It will be understood from the foregoing that an inward movement of the wedges 9 toward each other, will force the arms away from each other and thereby carry the brake shoes into frictional contact and braking engagement with the peripheries or tread surfaces of the car wheels, while an opposite movement of the wedges, that is, a movement away from each other, will permit the arms 6 of each pair to move inwardly and relieve the braking effect.

In order to actuate the wedges 9, they are pivotally connected at their inner ends to link rods 12, each of said rods being preferably constructed in extensibly connected sections for the purposes of adjustment, the extension and contraction being, in the present embodiment of the invention, effected by means of turn buckles 13. The link rods 12 extend inwardly toward each other from the wedges 9 and are pivotally connected at their inner ends to the crank arms 14 that are carried by a vertically disposed spindle 15 journaled at its lower end in the bottom of the plate 1 and near its upper end in a cross bar 16 riveted or otherwise secured to the flanges of said plate. Preferably, in order to facilitate the assembling of the parts, the spindle 15 is inserted upwardly through an opening formed for it in the cross bar 16 and is then dropped into an opening 17 in the bottom of the supporting plate 1, the spindle being provided with a bearing collar 18, and a bushing 19 is then dropped into the relatively large opening which is formed in the cross bar 16 to provide for the passage of the spindle, so as to provide a journal bearing for the spindle at that point. The upper extremity of the spindle 15 has an actuating lever 20 secured to it intermediate of the ends of the lever, the said ends of the lever being pivotally connected to actuating rods 21 and 22, one of which is intended to lead to the air brake equipment and the other to a hand lever or the like, whereby the spindle 15 may be turned either by air pressure means or by hand.

From the foregoing description in connection with the accompanying drawing, the operation of my improved brake-operating mechanism will be apparent. In the practical use of the device, a turning movement of the spindle 15 in one direction will obviously tend to draw the link rods 12 inwardly and will consequently draw the wedges 9 inwardly toward each other between the adjoining ends of the brake arms 6, said brake arms being thereby forced away from each other and forwardly and rearwardly, so that the brake shoes will be brought into proper frictional contact with the peripheries of the wheels. A movement of the spindle 15 in the opposite direction will permit the brake shoes to release their hold upon the wheels, as is evident.

While the accompanying drawing illustrates what I believe to be the preferred embodiment of my invention, it is to be understood that the invention is not limited thereto, but that various changes may be made in the construction, arrangement and proportions of the parts without departing from the scope of the invention, as defined in the appended claim.

What I claim is:

In a brake mechanism, the combination with a frame having parallel upstanding flanges with registering notches adjacent their opposite ends, of brake arms slidably mounted in the notches of the upstanding flanges and having bifurcated inner ends, of rollers mounted in the bifurcated inner ends of the brake arms, a cross bar mounted centrally upon the upstanding flanges, a vertical rotary member mounted in the cross bar, double arms rigidly mounted upon the opposite ends of the rotary member and extending at different angles, tapered wedge blocks engaged in the bifurcated ends of each pair of brake arms and against the rollers mounted in said ends, connections between the wedge blocks and one of the double arms mounted upon the rotary member, whereby rotation of said member in one direction will cause the wedge blocks to force the brake arms outwardly, means connected with the other double arm for operating the rotary member, and means for guiding the brake arm.

In testimony whereof I hereunto affix my signature in the presence of two witnesses.

GEORGE L. GRAHAM.

Witnesses:
Mrs. G. L. GRAHAM,
FREDERICA S. STILL.

---

Copies of this patent may be obtained for five cents each, by addressing the "Commissioner of Patents, Washington, D. C."